United States Patent [19]
Host

[11] 3,810,592
[45] May 14, 1974

[54] FISHING REEL
[75] Inventor: Pierre L. Host, Cluses, France
[73] Assignee: Establissements Carpano & Pons S.A., Cluses, France
[22] Filed: July 2, 1971
[21] Appl. No.: 159,288

[30] Foreign Application Priority Data
July 8, 1970  France ............................ 70.25360

[52] U.S. Cl........................................ 242/84.51 A
[51] Int. Cl........................................... A01k 89/02
[58] Field of Search... 242/84.21 R, 84.2 R, 84.2 G, 242/84.5 A, 84.51 A, 84.2 A

[56] References Cited
UNITED STATES PATENTS
| 2,858,087 | 10/1958 | Giaimo | 242/84.21 R |
| 3,120,357 | 2/1964 | Wood, Jr. | 242/84.5 A |
| 2,904,281 | 9/1959 | Jackson | 242/84.21 R |
| 2,863,617 | 12/1958 | Chapin et al. | 242/84.21 R |
| 2,918,227 | 12/1959 | Mauborgne | 242/84.21 R |

FOREIGN PATENTS OR APPLICATIONS
1,074,316  1/1960  Germany ...................... 242/84.5 A Primary Examiner—Billy S. Taylor
Attorney, Agent, or Firm—Robert E. Burns; Emmanuel J. Lobato

[57]      ABSTRACT

A casting reel with a torque limiter of which the adjustment member is located at a point enabling the angler to actuate this member without releasing the crank, comprises means for reducing or even zeroing the braking torque value by simply exerting an axial pressure with the hand against said adjustment member, the release of said axial pressure causing the braking torque to resume instantaneously its preset value.

3 Claims, 8 Drawing Figures

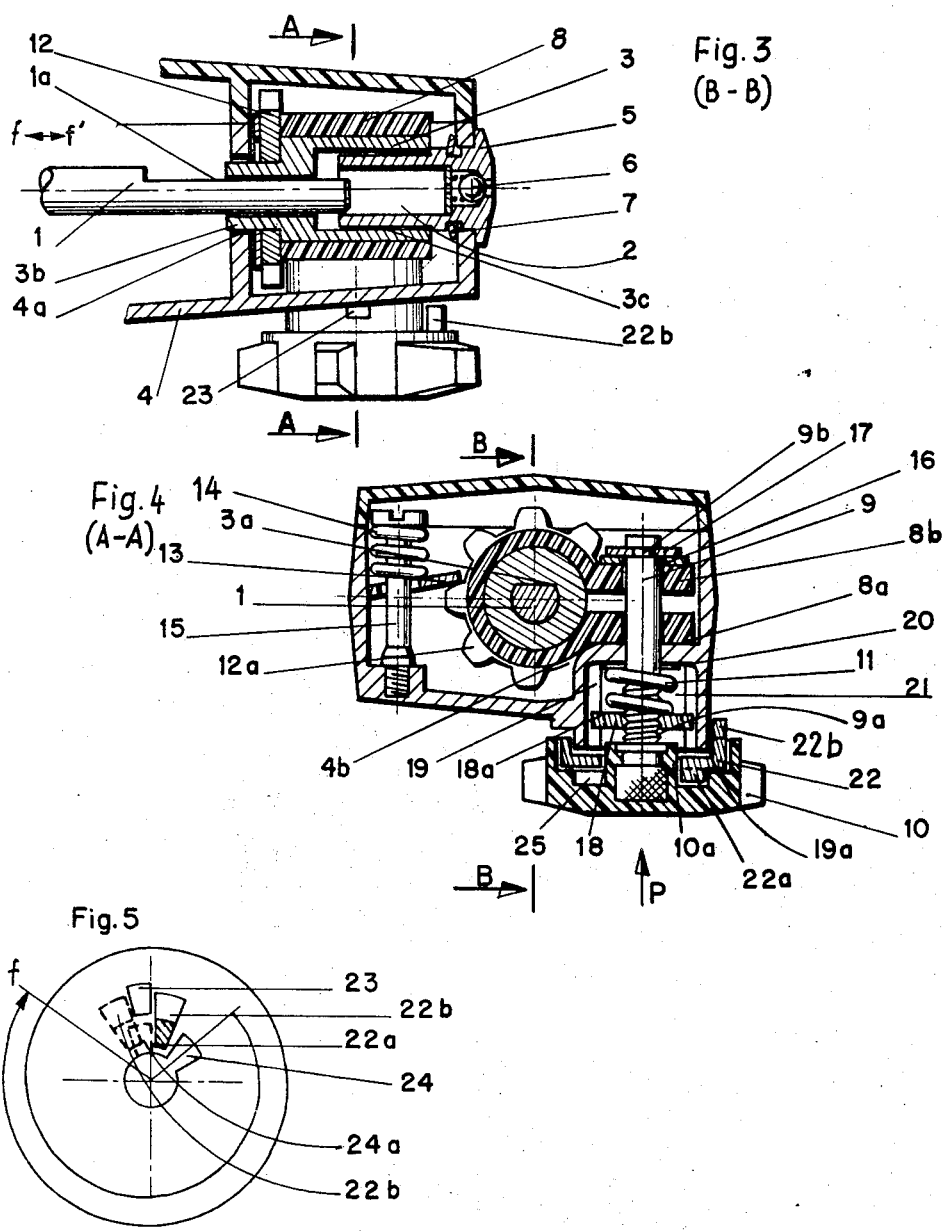

FISHING REEL

The present invention relates to casting fishing reels and in particular to reels of the so-called fixed spool or drum type. As a rule, these reels are provided with a torque limiter of the adjustable friction type, known as the "drag adjustment," for preventing the rupture of the line when a fish caught by the hook exerts a considerable tractive effort on the outer end of the line.

In most cases, the torque limiter of these reels is housed within the spool proper. However, this arrangement is attended by serious drawbacks. Thus, in particular, the torque-limiting element is not water-tight and is disposed at the front end of the reel where spray is most effective. Salt water, more particularly, may then cause salt to accumulate within the torque limiter, thus considerably modifying the technical characteristics of the limiter and promoting the corrosion thereof.

This inconvenience has been attenuated in several reels by disposing the torque limiter not within the spool proper but on the central pin of the reel, in the rear portion of the housing. Thus, the limiter is protected more efficiently from water sprays.

However, this arrangement did not compensate a serious defect. In fact, the position of the member controlling the torque-limiter does not permit easy adjustment of the frictional torque, since the angler must adjust the limiter with the same hand holding the crank.

Thus, during a catch, for example, the angler is frequently confronted with the difficult task of mastering a large, struggling fish. He must firmly hold the rod with both hands and "exhaust" his catch. Thus, it is clear that the position and control system of the torque-limiter should be such as to enable the user to perform the alternate tightening and release of the friction force without major difficulties.

The general purpose of the invention and a contrast with prior art reels will now be made with reference to FIGS. 1 and 2 of the accompanying drawings which are perspective views showing a fishing rod and casting reel held in an angler's hands.

The casting reel according to this invention will be described more in detail with reference to FIGS. 3 to 8 of the accompanying drawings illustrating diagrammatically, and by way of example, two different embodiments thereof. In the drawings:

FIG. 3 is a fragmentary longitudinal section taken across the reel housing, showing the system for limiting the torque passing through the spool axis;

FIG. 4 is a section taken along the line A—A of FIG. 3;

FIG. 5 is a diagram illustrating the actuation of the torque-limiter and its safety catch;

Figure 1:
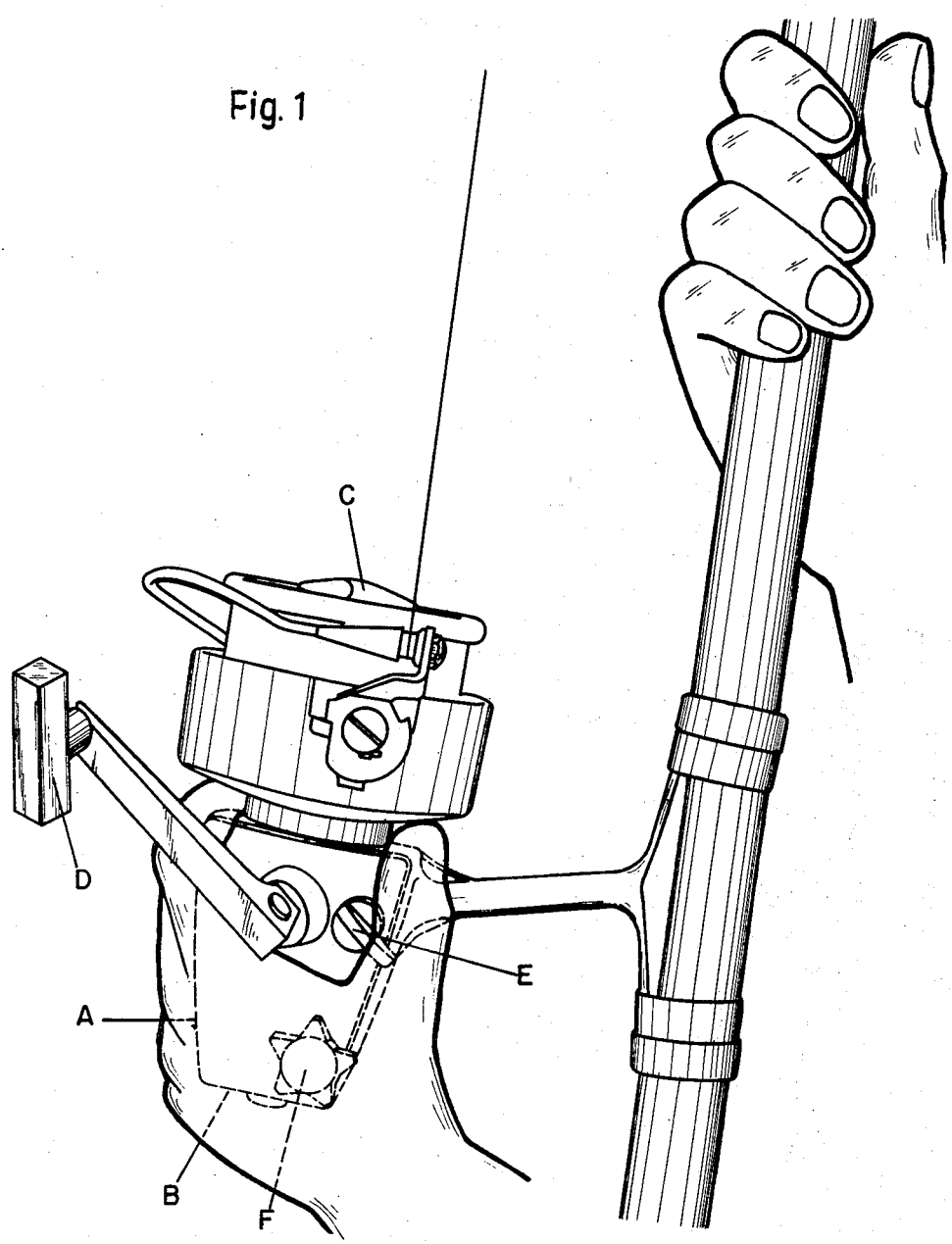

FIG. 1 shows the various possible locations of the friction torque adjustment member. In addition to position C at the front end of the spool, which was criticized hereinabove, it is also known to dispose the adjustment member at B, behind the housing, or at A, on the lateral surface of this housing. These two arrangements are detrimental to a satisfactory use of the rod and reel assembly, notably for "sport" angling and saltwater fishing. In either case powerful, double-handed rods and heavy reels are used, and the proper manoeuver for recovering a catch consists in holding the rod with the right hand, ahead of the reel, with the left hand in a backward position, either on the rod or on the reel proper. Thus, a considerable lever arm is available to enable the angler to properly control his efforts.

The role of the angler's left hand is multifarious. Thus, the left hand has firstly a "driving" function in that it must actuate very rapidly the crank D controlling the line winding action; the lever E preventing the backward movement, and the torque-limiter adjustment knob which, as explained in the foregoing, may have various locations on the housing. Therefore, the problem to be solved consists in disposing this adjustment knob at the most convenient location.

Figure 2:
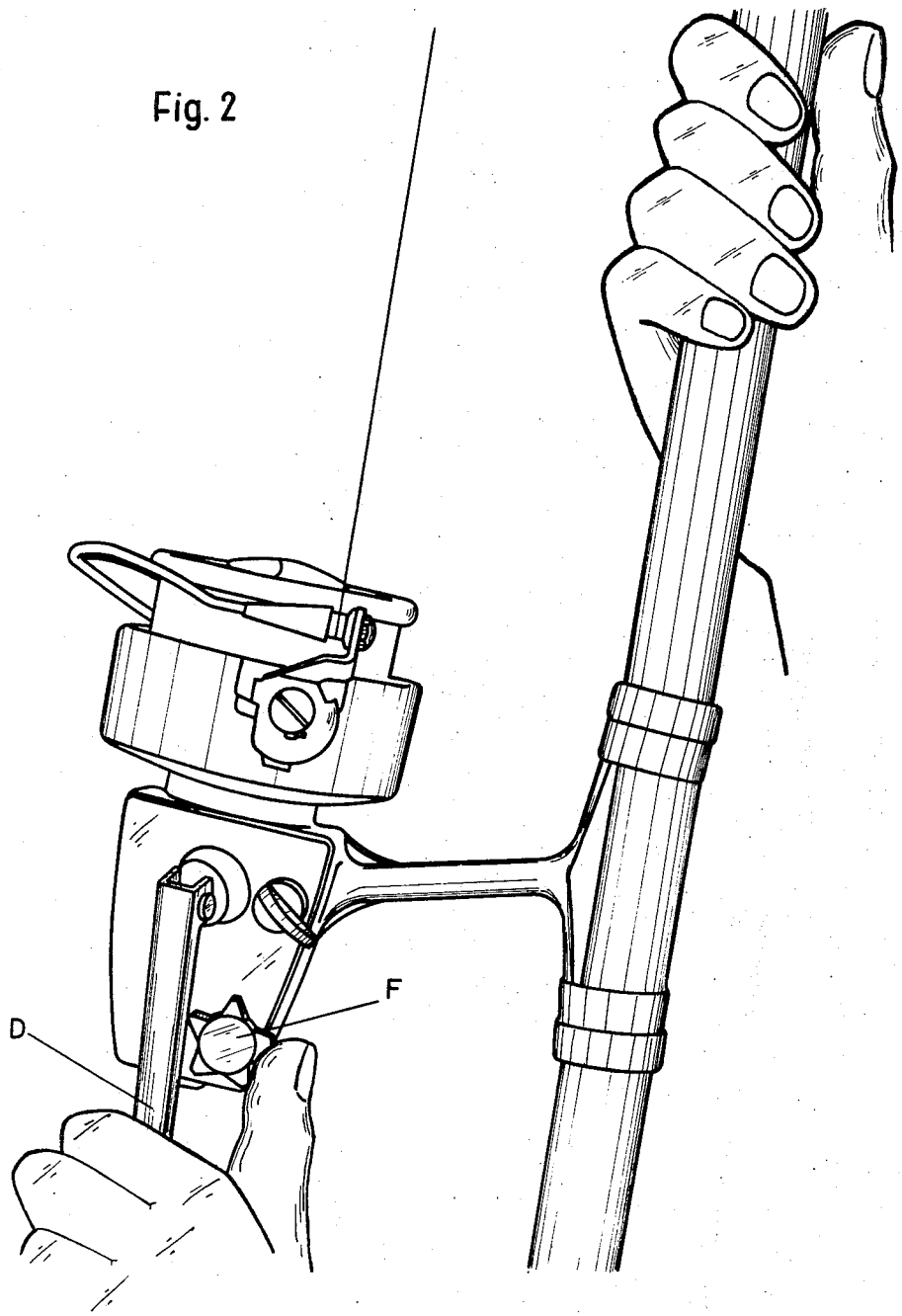

It is an object of the present invention to locate the torque-limiter adjustment member at a position F such that the angler can operate this member without releasing the crank. Referring to FIG. 2, it will be seen in fact that the knob position F illustrated therein, i.e., at the righthand lower edge of the housing, on the crank side, and the toothed shape of this knob, enable the angler, whilst he holds the crank in his hand, to actuate the knob with a finger of his left hand without releasing his grip on the crank D.

Another advantageous feature characterizing the casting reel of this invention is the possibility of reducing to zero the braking torque of the limiter by simply depressing the knob F in the axial direction.

Figure 7:
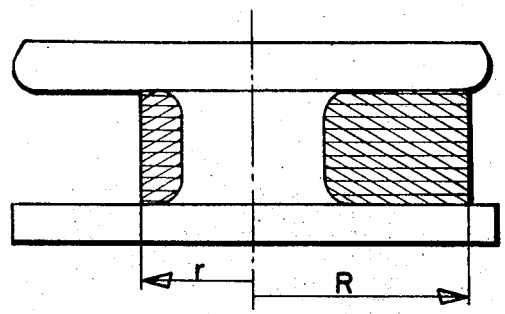
FIGS. 7 and 8 are an elevational view and a plan view respectively of the reel spool.
Figure 8:
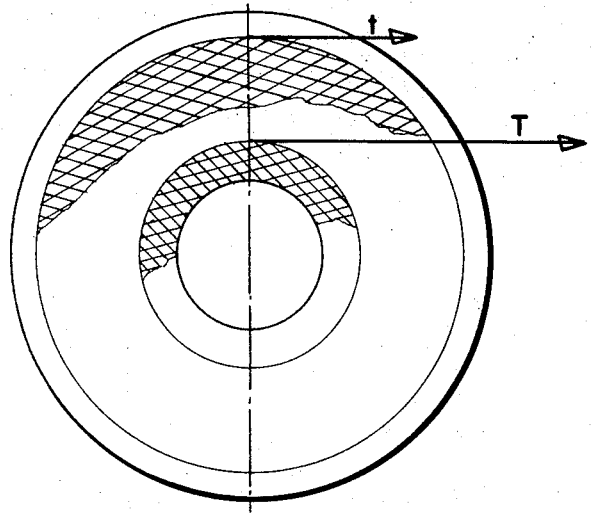

It is well known to accentuate the braking torque by depressing the knob in the axial direction. However, this principle is not advantageous in casting reels of this type. In fact, as described hereinafter with reference to FIGS. 7 and 8 of the accompanying drawings, the so-called "fixed-spool" reels comprise a spool of which the outer diameter is several times greater than the height available for winding the line. From a spool fully wound with line, having a winding radius R (FIG. 7), it will be seen that after the casting movement the winding radius is reduced to $r$, within the range of, say, $R/2$ to $2R/3$. Now, before casting, the angler adjusts his torque-limiter to a resistant value C, so that the corresponding line tension $t$ is just less than the rupture limit of the line concerned, i.e., $C = R \times t$. For a given adjustment of the torque-limiter, C is a constant. Now, under fishing conditions if the radius R becomes $r$, we have: $C = \text{Constant} = r \times T$, where T is the corresponding new limiting value of the line tension to rotate the spool. Since we know that $R/2 < r < 2R/3$, the line tension T is given by $3t/2 < T < 2t$. If initially $t$ corresponded to a value lower than the limit or braking point of the line, the same does not apply to T, and unless the knob adjustment is modified the line will break. Therefore, it will be seen that a torque-limiter associated with a so-called "fixed spool" reel must, to be efficient, permit an easy actuation in the direction to reduce, not to increase, the braking effort or torque during the angling action. A reel according to this invention has this specific feature and enables the angler to modify at will the braking torque in the direction to decrease same by exerting a gradual pressure on the knob, the pre-adjusted tension being restored instantaneously when this pressure is released.

This arrangement is advantageous in that it makes it possible to cope immediately with a change in the frictional characteristics of the torque-limiter, for example after a prolonged period of operation and as a consequence of the considerable heat energy consumed, a mere succession of knob pressure and release actions is sufficient for rapidly restoring the initial conditions of operation.

Another advantageous feature of the device of this invention is that during a catch the angler can release the crank and grip the reel housing with the palm of his left hand. Thus, his two hands exert a powerful lever action on the rod and, through the action of the left hand palm, permit modulation of the braking torque by depressing the knob F without discontinuing the action exerted on the rod. This advantageous feature is particularly valuable in salt-water fishing.

Referring to FIG. 3, an axial reciprocating motion is imparted by means not shown to the central pin 1 supporting the spool (not shown). This pin 1 is mounted for free translation in relation to a friction cylinder 3 but rotates bodily with this cylinder, the necessary coupling consisting for instance of a flat face 1a formed on pin 1, as shown in FIG. 4.

The friction cylinder 3 is trunnioned for free rotation with its journal 3b in a bore 4a, and through another bore 3c to the rear fixed bearing 5. This cylinder may advantageously consist of self-lubricating sintered materials. The rear bearing 5 is provided with a grease nipple 6. The bearing 5 is secured to the housing 4 for example by means of a spring ring or circlip 7.

A friction clamp 8 is mounted on cylinder 3. In the figure, it consists of a one piece element, and can be made of metal or suitable plastic material. This friction clamp 8 is so arranged in the housing 4 that it is fastened thereto through a branched portion 8a clearly visible in FIG. 4, this branched portion 8a bearing with its lower face against the face 4b of housing 4.

The construction of this clamp 8 is such that when its two arms or branches 8a and 8b are unstressed, no friction is exerted between the clamp 8 and spool 3. Under these conditions, it is clear that if a tangential effort is exerted at the spool level of this reel (FIG. 1) the spool, pin 1 and cylinder 3 can revolve freely. Thus, the torque-limiter is disengaged.

The branches 8a and 8b of clamp 8 are bored to permit the free therethrough of a control rod or axle 9. This rod is rigid with the control knob 10. A resilient member such as a spring 11 is provided for varying at will, by rotating the control member 10, the pressure exerted on the aforesaid branch 8b of the braking clamp. Thus, the frictional torque between the spool and clamp 8 can be adjusted at will with the clamp 8 acting as a friction lining.

A toothed wheel 12 is rigid with the friction cylinder 3. During the cylinder rotation, the wheel 12 is driven thereby and its teeth 12a actuate the flat pawl 13 urged by a spring 14, these members 13 and 14 being mounted on the housing 4 by means of a screw 15. The assembly 12, 13, 14 and 15 constitutes a sound alarm device well known in reels of this type.

A cylindrical groove 9b formed on the rod 9 of the torque-limiter control system permits insertion of a spring washer 17 for retaining another washer 16. These two washers constitute thrust means for retaining the compressive effort of spring 11 when the knob 10 is actuated.

The control rod 9 comprises a screw-threaded portion 9a controlling a corresponding nut 18 formed with a pair of lugs 18a slidably engaging a pair of axial grooves 19 formed in the reel housing 4. The compression spring 11 is disposed between this nut 18 and another washer 20 bearing against the bottom of the recess 21 of housing 4, and the washer 20 constitutes an efficient sealing means for protecting the interior of the device. When the knob 10 is rotated in the proper direction, the nut 18 is screwed to compress the spring 11 so that the frictional torque is increased, the rotation of said nut in the opposite direction being attended by a torque reduction. This construction is such that any translational axial movement of the control knob 10 is definitely precluded during the above described operations. However, if a pressure is exerted on the control knob 10 in the direction P, the pressure exerted by spring 11 against the branch 8b of clamp 8 may be reduced and even cancelled completely. With the above-described device it is thus possible to adjust the frictional force of the torque-limiter by rotating the knob 10 and to obtain instantaneously, by exerting thereon an axial pressure in the direction P, a reduction, down to complete elimination, of the friction exerted on the cylinder 3 and therefore on the pin 1 and the reel spool. Thus, when the axial pressure exerted on knob 10 is released, the frictional torque is restored immediately to its initial, preset value.

It might be feared in case the limiter control member were tightened to the extent causing the coils of spring 11 to contact one another, that any further modulation of the braking pressure could definitely be precluded. This inconvenience is avoided by the provision of a thrust washer 22.

To this end, the thrust washer 22 comprises two axially projecting lugs 22a, 22b. Lug 22a engages a groove 25 formed in the control knob, and lug 22b extends externally of the outer wall 19a of housing 19 and is so shaped and dimensioned that it is adapted to abut against a stud 23 which is rigid with the housing 4 and located along a diameter 19a. FIG. 5 affords a clear understanding of the advantageous mode of operation of this device. The pitch of the screw-threads 9a and the pitch and force of spring 11 are so calculated that through slightly less than two revolutions of control knob 10 the braking torque obtained is at least equal to the maximum value permissible in a device of this character, and that the spring 11 cannot be compressed home (with contacting coils). Therefore, this brake can be released at any time.

In fact, as shown in thick lines in FIG. 5, when the device is assembled, the frictional torque is zero, and the control knob 10 can rotate freely in the direction of the arrow $f$ until its segment 24 lies at 24a. The control knob 10 thus drives, through its segment 24, the washer 22 by engaging the lug 22a thereof until the opposite lug 22b abuts against the stop stud 23 rigid with the housing. Thus, the change is from a zero braking force to a maximum braking force with a total brake control knob rotation approximating 600°. Of course, this system could be modified, if desired, without departing from the basic principles of the invention, by adding one or more washers having the same function as washer 22, so that the same results could be obtained but by knob rotations well over 600°. In any case, this path limiting system is well known in the art.

Figure 6:
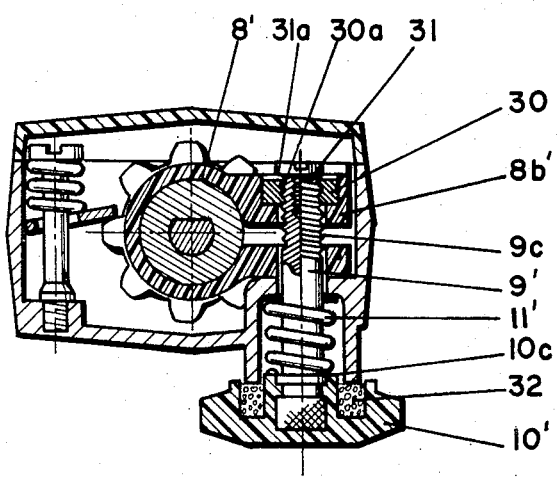
FIG. 6 is a view similar to FIG. 3 for another embodiment of the device in this invention.

The modified form of embodiment illustrated in FIG. 6 is based on the same principle but affords a more economical construction.

The control knob assembly 10' respectively is such that its rod 9' respectively comprises a screw-threaded portion 9c engaging a nut 30 rigid with the branch 8b' of clamp 8'. A screw 31 engages a coaxial tapped hole of rod 9' and the diameter of the head 31a of this screw is greater than the inner diameter 30a of said nut. This head 31a acts as a stop member when the control knob 10' is unscrewed home, so as to limit this unscrewing movement. When screwing in or out the control knob 10' the face 10c thereof compresses the spring 11' directly. A plastic sealing gasket 32 is provided for absorbing the effort of translation of knob 10' during its rotation. The only limit in the system illustrated in FIG. 6 is that the spring can be compressed home, i.e., until its coils contact, so that any possibility of reducing the frictional torque by depressing the knob could be precluded. However, it is possible to avoid this result by making the compression spring 11' of such dimensions that the maximum practical value of the frictional torque is attained before the spring coils contact one another.

The casting reels equipped with the device of this invention are particularly advantageous for salt-water fishing and generally for strong fighting fish, and also in conditions likely to give rise to salt-water sprays.

What is claimed is:

1. A fishing reel of the casting type comprising; a reel housing; a normally fixed line spool disposed in said housing; and an adjustable friction torque limiter for allowing rotation of said line spool when a torque greater than the frictional torque of said limiter is applied to said line spool, said adjustable torque limiter comprising an axle, a knob fixedly mounted on said axle externally of said housing, means mounting said knob and said axle for both rotation about the longitudinal axis of said axle and axial displacement along the longitudinal axis of said axle inwardly from and outwardly towards an outer rest position with respect to said housing in response to a force applied along said longitudinal axis, a compression spring urging said knob and thereby said axle axially outwardly towards said rest position, means responsive to the force of compression of said spring for applying a braking force to the spool as a function of the force of compression of the compression spring when the knob is in said rest position, means responsive to the rotation of said knob and said axle when same are in said rest position for adjusting the force of compression of said spring to a selected value as a function of the angular position of the knob relative to said housing to adjust the braking force applied to said spool to a selected value, and means responsive to the inward and outward axial displacement of said knob and said axle for reducing the braking force from the selected value of braking force to a reduced value of braking force as a function of the axial inward displacement of said knob and said axle from said rest position when said knob and said axle are inwardly displaced and for restoring the braking force to the selected value of braking force when said knob and said axle are in said rest position.

2. A fishing reel according to claim 1; further comprising means for limiting the angular displacement of said knob so that said spring cannot be fully compressed in response to rotation of said knob but can always be compressed in response to axial inward displacement of said knob from said rest position by an amount sufficient to fully cancel transmission of the force of said spring to said brake member so that said selected value of the torque cannot exceed a given maximum value.

3. A fishing reel according to claim 1; wherein said means for limiting the angular displacement of the knob comprises a projection fixed for rotation with said knob, a stop member on said housing, and a piece mounted for rotation about said axle relative both to said knob and to said housing, said piece comprising a first lug lying in the path of rotation of said projection of said knob to effect rotation of said piece by said knob and a second lug abuttable against said stop member of said housing for limiting rotation of said piece in either direction.

* * * * *